US009895660B2

(12) United States Patent
Janssens et al.

(10) Patent No.: US 9,895,660 B2
(45) Date of Patent: Feb. 20, 2018

(54) METHOD FOR PRODUCING METAL EXCHANGED MICROPOROUS MATERIALS BY SOLID-STATE ION EXCHANGE

(71) Applicant: Haldor Topsøe A/S, Kgs. Lyngby (DK)

(72) Inventors: Ton V. W. Janssens, Bagsværd (DK); Peter N. R. Vennestrøm, Copenhagen S (DK)

(73) Assignee: Haldor Topsoe A/S, Lyngby (DK)

(*) Notice: Subject to any disclaimer, the term of this patent is extended or adjusted under 35 U.S.C. 154(b) by 0 days.

(21) Appl. No.: 15/125,502

(22) PCT Filed: Oct. 15, 2014

(86) PCT No.: PCT/EP2014/072146
§ 371 (c)(1),
(2) Date: Sep. 12, 2016

(87) PCT Pub. No.: WO2015/154829
PCT Pub. Date: Oct. 15, 2015

(65) Prior Publication Data
US 2017/0274322 A1    Sep. 28, 2017

(30) Foreign Application Priority Data

Apr. 7, 2014 (DK) .................................. 2014 00200
Aug. 26, 2014 (DK) ................................ 2014 00476

(51) Int. Cl.
| | |
|---|---|
| *B01D 53/94* | (2006.01) |
| *B01J 29/46* | (2006.01) |
| *B01J 29/06* | (2006.01) |
| *B01J 29/85* | (2006.01) |
| *B01J 29/14* | (2006.01) |
| *B01J 29/76* | (2006.01) |

(52) U.S. Cl.
CPC ........ *B01D 53/9418* (2013.01); *B01J 29/061* (2013.01); *B01J 29/14* (2013.01); *B01J 29/46* (2013.01); *B01J 29/763* (2013.01); *B01J 29/85* (2013.01)

(58) Field of Classification Search
None
See application file for complete search history.

(56) References Cited

U.S. PATENT DOCUMENTS

| | | |
|---|---|---|
| 2009/0196812 A1 | 8/2009 | Bull et al. |
| 2010/0075834 A1 | 3/2010 | Hurgobin et al. |
| 2010/0267548 A1 | 10/2010 | Andersen et al. |
| 2013/0004398 A1 | 1/2013 | Grossschmidt et al. |
| 2013/0251611 A1 | 9/2013 | Wen et al. |

FOREIGN PATENT DOCUMENTS

| | | |
|---|---|---|
| EP | 0 955 080 A1 | 11/1999 |
| WO | WO 94/08925 A1 | 4/1994 |
| WO | WO 2008/009453 A2 | 1/2008 |
| WO | WO 2008/118434 A1 | 10/2008 |

OTHER PUBLICATIONS

Peter Vennestrøm, et al. "Influence of lattice stability on hydrothermal deactivation of Cu—ZSM-5 and Cu—IM-5 zeolites for selective catalytic reduction of $NO_x$ by $NH_3$" Journal of Catalysis, vol. 309. 2014, pp. 477-490.

Blanka Wichtelová, et al. "Effect of water vapour and ammonia on the solid-solid interaction of Cu oxide with Y-type zeolite: preparation of catalyst for reduction of nitric oxide with ammonia at low temperature.", Applied Catalysis A: General, vol. 103. 2, Sep. 1, 1993, pp. 269-280.

Di Wang, et al. "$NH_3$-SCR over Cu/SAPO-34-Zeolite acidity and Cu structure changes as a function of Cu loading" Catalysis Today, vol. 231, 2014, pp. 64-74.

*Primary Examiner* — Sheng H Davis
(74) *Attorney, Agent, or Firm* — Blank Rome LLP

(57) ABSTRACT

A method is disclosed for the preparation of a metal exchanged microporous materials, e.g. metal exchanged silicoaluminophosphates or metal exchanged zeolites, or mixtures of metal exchanged microporous materials, comprising the steps of providing a dry mixture of a) one or more microporous materials that exhibit ion exchange capacity and b) one or more metal compounds; heating the mixture in a gaseous atmosphere containing ammonia and one or more oxides of nitrogen to a temperature and for a time sufficient to initiate and perform a solid state ion exchange of ions of the metal compound and ions of the microporous material; and obtaining the metal-exchanged microporous material.

21 Claims, No Drawings

METHOD FOR PRODUCING METAL EXCHANGED MICROPOROUS MATERIALS BY SOLID-STATE ION EXCHANGE

The present invention relates to a method for the preparation of metal exchanged microporous materials or mixtures of metal exchanged microporous materials by exposing a physical mixture of a metal oxide or a metal salt, or a combination thereof, and a microporous material having an ion exchange capability or a mixture comprising such materials, to an atmosphere containing ammonia and one or more oxides of nitrogen.

Cu- and Fe-exchanged microporous materials, like zeolites and zeotypes are effective catalysts for the reduction of $NO_x$, e.g. in the exhaust of power plants, or in the exhaust of diesel engines in both stationary and transport applications. The catalytic reduction of $NO_x$ is referred to as SCR (selective catalytic reduction). The two best known varieties of the SCR process to reduce $NO_x$ are (1) hydrocarbon SCR (HC-SCR), in which hydrocarbons are used as a reductant, and (2) ammonia-SCR ($NH_3$-SCR) in which ammonia is used as a reductant. In the case of HC-SCR, the source of the hydrocarbons is the diesel fuel of the engine or residual hydrocarbons in the exhaust gas due to incomplete combustion in the engine. The common technology for using $NH_3$-SCR is by injection of urea in the exhaust gas stream, which decomposes to produce the required $NH_3$ for the SCR reaction.

A general method to produce metal exchanged zeolites is by contacting a zeolite with a solution of the desired metal ion followed by filtration, washing, drying and calcination at high temperatures (e.g >500° C.). Consequently, following this general procedure, contacting a zeolite with an appropriate solution containing Cu, Co or Fe ions, such as copper nitrate, copper acetate, cobalt acetate, iron nitrate, copper or iron sulfate, with an arbitrary zeolite in the $Na^-$, $K^+$, $H^+$, $NH_4^+$ form, or a different cation-form, will usually produce a material that shows catalytic activity for the SCR reaction with hydrocarbons or $NH_3$. The choice of the anion of the metal salt is in principle arbitrary, but usually anions are chosen such that sufficient solubility is obtained, can easily removed during the production, is safe to handle, and does not interact with the zeolite in an unfavourable way.

Most zeolite structures produce active catalysts for hydrocarbon SCR and $NH_3$ SCR after ion exchange with Cu, Co or Fe, the best known examples are ZSM-5, beta, SSZ-13 and zeolite Y, but other zeolite types are also known to show activity for SCR after ion exchange. [B. Moden, J. Donohue, W. Cormier, H. Li, *Stud. Surf. Sci. Catal.* 2008, 174, 1219-1222; O. a Anunziata, A. R. Beltramone, Z. Juric, L. B. Pierella, F. G. Requejo, *Appl. Catal. A Gen.* 2004, 264, 93-101; M. Moliner, C. Franch, E. Palomares, M. Grill, A. Corma, *Chem. Commun. (Camb).* 2012, 48, 8264-6; C. Franch-Martí, C. Alonso-Escobar, J. L. Jorda, I. Peral, J. Hernández-Fenollosa, A. Corma, A. E. Palomares, F. Rey, G. Guilera, *J. Catal.* 2012, 295, 22-30; A. E. Palomares, J. Prato, A. Corma, *Catal. Today* 2002, 75, 367-371.] In fact, the activity for the SCR reaction is due to the ion exchanged Cu, Co or Fe, and the local chemical environment of these ions in the different zeolite structures is very similar, and not very dependent on the crystal structure of the zeolite. Therefore, one can expect catalytic activity for any Cu, Co, and Fe exchanged zeolite, or in general, if a given cation is known to have some SCR activity on one type of zeolites, it can be expected to show SCR activity in other zeolites as well. Differences in performance of various zeolite structures can arise from differences in framework stability of the zeolite or stability of the exchanged Cu or Fe in the zeolites [S. Brandenberger, O. Kröcher, M. Casapu, A. Tissler, R. Althoff, *Appl. Catal. B Environ.* 2011, 101, 649-659; P. N. R. Vennestrøm, T. V. W. Janssens, A. Kustov, M. Grill, A. Puig-Molina, L. F. Lundegaard, R. R. Tiruvalam, P. Concepción, A. Corma, *J. Catal.* 2014, 309, 477-490.].

The ion exchange capability of zeolites originates from the fact that some of the framework Si atoms are replaced by aluminium atoms or other heteroatoms. As the formal charge of Si is 4+, and that of Al is 3+, such a substitution creates an effective negative charge in the zeolite crystal, or by isomorphous substitution with other heteroatoms having a lower formal charge than Si has to be is counter balanced by a positive ion, e.g. $H^+$, $NH^{4+}$, $Na^-$ or $K^-$. Cu and Fe can also form suitable cations to counterbalance this negative charge, which is the reason that Cu and Fe exchanged zeolites can be produced by the method described above. Zeolites are porous crystalline aluminosilicates. There exist also other materials, which are not alumina silicates, with a porous crystal structure and a capability of ion exchange, e.g. zeotype materials such as silicoaluminophosphates (SAPO).

The ion exchange capability arises from the same phenomenon: some of the framework atoms are replaced by an atom with a different valence state, and consequently a charge compensation by exchangeable ions is required. An example of such a material is SAPO material, which is a porous crystalline aluminium phosphate in which some of the phosphorous atoms (formal charge 5+) are replaced by Si (formal charge 4+). SAPO materials exchanged with Fe or Cu are also known as effective catalysts for both HC-SCR and $NH_3$-SCR, the best known example of such a material is Cu-SAPO-34.

Even though the method of ion exchange for zeolite-based materials and silicoaluminophosphate materials is essentially the same, there is a significant difference in the efficiency of the ion exchange. For example, the SSZ-13 and SAPO-34 materials have the same CHA crystal structure, with essentially the same pore size and structure. Nevertheless, in a solution based ion-exchange with Cu, the Cu atoms are distributed through the entire volume of the material with SSZ-13, while the Cu has a tendency to be deposited in the outer surface of the crystals with SAPO-34 [P. N. R. Vennestrøm, A. Katerinopoulou, R. R. Tiruvalam, A. Kustov, P. G. Moses, P. Concepcion, A. Corma, *ACS Catal.* 2013, 3, 2158-2161]. As a consequence, the degree of Cu ion exchange in a SAPO-34 material obtained with the solution based ion exchange procedure is generally low, and the Cu loadings in SAPO-34 obtained by this method are generally significantly lower than in the analogous SSZ-13 material. Consequently, the freshly ion-exchanged Cu-SAPO-34 zeolites generally have a low activity for SCR.

It is known that to obtain a sufficiently high activity for the SCR reaction with a SAPO-34 material, activation at high temperatures (>750° C.) is needed. (P. N. R. Vennestrøm, A. Katerinopoulou, R. R. Tiruvalam, A. Kustov, P. G. Moses, P. Concepcion, A. Corma, *ACS Catal.* 2013, 3, 2158-2161). It has been shown that such a heating procedure causes a redistribution of the Cu throughout the SAPO-34 crystals, implying a higher degree of Cu ion exchange.

An alternative procedure to introduce ions in crystalline microporous materials is by solid state ion exchange, which involves making a dry solid-state mix of the microporous materials and a compound of the cations to be introduced into the microporous crystals, followed by some appropriate treatment that will drive the cations into the microporous materials. (G. L. Price, in: J. R. Regalbuto (Ed.), Catalyst Preparation: Science and Engineering, CRC Press, Boca Raton, London, N.Y., 2007, pp. 283-296.)

Patent Application US 2013/0108544 discloses a method for the production of ion exchanged microporous materials by producing metal oxide or metal salt particles on the surface of SAPO-34 crystals, followed by heating at 500-800° C., preferably 650-750° C. to produce the metal cations, for a period of 12-72 hours. The metal oxide particles or metal salt particles are formed on the surface of the SAPO-34 crystals by impregnation or precipitation. This procedure is different from a conventional ion exchange, since the actual ion exchange step is performed after removing the liquid needed for impregnation or deposition. The procedure prescribes a high temperature and long heating times. The procedure can be executed in dry or wet air.

A variation of this method is described in D. Wang, L. Zhang, J. Li, K. Kamasamudram, W. S. Epling, Catal. Today (2013), DOI 10.1016/j.cattod.2013.11.040 and M. Zamadics, X. Chen, L. Kevan, J. Phys. Chem. (1992) 5488. Instead of producing the metal oxide particles on the surface of the SAPO crystals, the SAPO-34 in the H form was physically mixed with CuO and heated to 800° C. for 12 h. The accomplishment of Cu ion exchange could be confirmed in both publications.

Some solid-state ion exchange can occur between a mixture of copper oxide and an H-ZSM-5 zeolite at 550° C. in a gas mixture typical for the selective catalytic reduction of nitrogen oxides by ammonia, i.e. ca. 500 ppm NO, 530 ppm $NH_3$, 5% $H_2O$, 10% $O_2$ in $N_2$, as deduced from the observation that treatment of a mixture of CuO and H-ZSM-5 yields a material with an SCR activity similar to that of a conventionally Cu-ion exchanged H-ZSM-5, and that neither CuO nor H-ZSM-5 alone show such an activity. (P. N. R. Vennestrøm, T. V. W. Janssens, A. Kustov, M. Grill, A. Puig-Molina, L. F. Lundegaard, R. R. Tiruvalam, P. Concepción, A. Corma, J. Catal. 2014, 309, 477-490.) The use of mixtures of copper oxide and zeolite mixtures to remove nitrogen containing compounds in the purification of an exhaust gas is also known from Patent EP1787720. Catalysts in this patent were in all cases heated to 500° C.

Patent EP955080 discloses a method for the introduction of Cu Fe, Co, Mn, Pd, Rh, or Pt in zeolites with a Si/Al ratio larger than 5 by physically mixing (i) ammonium salts, $NH_3/NH_4^+$-zeolites, or N-containing compounds, and (ii) a zeolite with a Si/Al ratio larger than 5, and (iii) an active compound chosen from a compound of one or more of the aforementioned metals at room temperature and atmospheric pressure and heated to at least 300° C. until the ion exchange process is completed, followed by cooling to room temperature. During heating, the mixture is preferably exposed to an ammonia or amine-containing atmosphere, with a heating rate higher than 10 K per minute.

Patent Application US2013004398 discloses a method for the introduction of Fe in zeolites by exposure of the zeolites to iron-pentacarbonyl, which enables to produce zeolites with a greater number of iron sites than cationic positions, and a uniform distribution of the iron in the zeolite. Using this method, SCR active Fe-beta catalysts could be produced at 200° C. The preparation of an Fe-SSZ-13 (CHA) catalyst included a 48 h treatment at 700° C. in steam.

Patent applications US2010075834 and WO08009453 disclose a method for the production of ion exchanged (metal-doped) zeolites by mixing a zeolite and a compound of the active metal and grinding the mixture. The mixture is then heated to a predefined temperature and kept at that temperature for a certain time. During heating, the pressure in the reactor is reduced to 0-200 mbar. The reported temperature for the preparation of an Fe-beta catalyst is 500° C.

Our invention builds on the observation that preparation of metal exchanged crystalline microporous materials is much improved when carrying out the solid state ion exchange with a physical mixture of an oxide and/or salt of a metal and a crystalline microporous material is performed in an atmosphere containing NO and $NH_3$. This is quite surprising in view of the fact that NO alone does not enhance the ion exchange process.

One advantage of the present invention is that the metal-exchanged microporous material can be produced at temperatures below 300° C. This provides a preparation route for SCR active microporous materials at temperatures below 300° C.

Pursuant to the above observation, this invention provides a solid state ion exchange method for the preparation of metal exchanged crystalline microporous materials or mixtures containing crystalline microporous materials comprising the steps of providing a dry mixture containing a) one or more crystalline microporous materials that exhibit ion exchange capacity and b) one or more metal compounds; heating the mixture in a gaseous atmosphere containing ammonia and one or more oxides of nitrogen to a temperature and for a time sufficient to initiate and perform a solid state ion exchange of ions of the metal compound and ions of the crystalline microporous material; and obtaining the crystalline metal-exchanged microporous material.

Further details of the invention can be found in the following description of the invention and the dependent claims.

The crystalline microporous materials that can be used in the method according to the invention can be any microporous material with an ion exchange capability.

Preferably the crystalline microporous materials having an ion exchange capacity are zeolites, which are aluminosilicates, or zeotype materials, such as silicoaluminophosphates, with any crystal structure, for example, but not limited to AEI, AFX, CHA, KFI, LTA, IMF, ITH, MEL, MFI, SZR, TUN, *BEA, BEC, FAU, FER, MOR, LEV.

The best known examples of such materials relevant for the use in the SCR reaction are, but is not limited to, ZSM-5, zeolite Y, beta zeolite, SSZ-13, SSZ-39, SSZ-62, Chabazite, and SAPO-34, SAPO-44, Ferrierite and TNU-9.

A preferred embodiment is the exposure of the said mixture to an atmosphere containing ammonia and and one or more oxides of nitrogen, where the crystalline microporous materials are in the $H^+$, or $NH_4^+$-form.

Another embodiment is the exposure of the said mixture to an atmosphere containing ammonia and one or more oxides of nitrogen, where the cryrstalline microporous materials contain an organic structure directing agent.

Another embodiment is the exposure of the said mixture to an atmosphere containing ammonia and one or more oxides of nitrogen, wherein the metal compounds are metal oxides, metal nitrates, metal phosphates, metal sulfates, metal oxalates, metal acetates, or a combination thereof.

Another embodiment is the exposure of the said mixture to an atmosphere containing ammonia and one or more oxides of nitrogen, wherein the metals in the metal compounds are selected from the group Fe, Cu, and Co, or combinations thereof.

Another embodiment is the exposure of the said mixture to an atmosphere containing ammonia and one or more oxides of nitrogen, wherein the metal compounds comprise one or more oxides of Cu.

Another embodiment is the exposure of the said mixture to an atmosphere containing ammonia and one or more oxides of nitrogen, where the oxides of nitrogen are nitrogen monoxide, nitrogen dioxide, or a mixture thereof.

Another embodiment is the exposure of the said mixture to an atmosphere containing ammonia and one or more oxides of nitrogen, wherein the content of ammonia in the atmosphere is between 1 and 5000 vol. ppm.

Another embodiment is the exposure of the said mixture to an atmosphere containing ammonia and one or more oxides of nitrogen, wherein the content of the one or more nitrogen oxides in the atmosphere is between 1 and 5000 vol. ppm.

Another embodiment is the exposure of the said mixture to an atmosphere containing ammonia and one or more oxides of nitrogen, wherein the molar ratio of ammonia and nitrogen oxides is larger than 0.01, preferably between 0.2 and 1.

Another embodiment is the exposure of the said mixture to an atmosphere containing ammonia and one or more oxides of nitrogen, wherein the oxygen content in the atmosphere is 1 vol % or lower.

Another embodiment is the exposure of the said mixture to an atmosphere containing ammonia and one or more oxides of nitrogen, wherein the water content in the atmosphere is 5 vol % or lower.

Another preferred embodiment is the exposure of the said mixture to the atmosphere containing ammonia and one or more oxides of nitrogen at a temperature in the range between 100° C. and up to 300° C., preferably between 150° C. and 250° C.

A further aspect of the invention is a metal exchanged crystalline microporous material or mixtures of metal exchanged crystalline microporous materials obtained by a method according to anyone of the previous described aspects and embodiments of the invention.

Still an aspect of the invention is a method for the removal of nitrogen oxides from exhaust gas by selective catalytic reduction with a reductant, comprising contacting the exhaust gas with a catalyst comprising a metal exchanged crystalline microporous material or mixtures of metal exchanged crystalline microporous materials obtained in a method according to anyone of the previous described aspects and embodiments of the invention.

In an embodiment of the method for the removal of nitrogen oxides according to the invention, the reductant is ammonia or a precursor thereof.

In an embodiment of the method for the removal of nitrogen oxides according to the invention, the reductant is hydrocarbons.

EXAMPLE 1

A catalyst was prepared by mixing CuO and H-ZSM-5 zeolite to a content of 12.5 wt % CuO. A sample of the catalyst was put in a quartz-U tube reactor, and heated to 250° C. for 10 h in a controlled gas atmosphere. After heating, the catalyst was cooled down to 200° C. and exposed to a gas mixture of 500 ppm NO, 533 ppm $NH_3$, 5% $H_2O$, 10% $O_2$ in $N_2$, and the conversion of NO was measured at a space velocity of 2700 Nl/g cat h, as a record for the material's SCR activity. Table 1 provides an overview of the treatment gas mixtures used in the 10 h preparation step of the catalyst, together with the SCR activity of thus prepared catalyst measured as NO conversion afterwards.

From the results in Table 1, it becomes clear that the highest SCR activity is obtained when the catalysts are prepared by heating with $NH_3$ present in the treatment gas. The presence of NO enhances the effect of $NH_3$, while it has only a very limited or no effect if NO is present without $NH_3$. When water and/or oxygen are present during the heating, less active materials are obtained, and therefore the presence of water and oxygen is considered less favourable.

TABLE 1

Measured NOx conversion in the NH3-SCR reaction after treatment in different atmospheres as described in Example 1

| Treatment for 10 h at 250° C. in the following atmosphere | NOx conversion at 200° C. |
| --- | --- |
| No treatment | 1.4% |
| 5% $H_2O$ + 10% $O_2$ | 2.0% |
| 500 ppm NO + 10% $O_2$ + 5% $H_2O$ | 2.0% |
| 530 ppm $NH_3$ + 10% $O_2$ + 5% $H_2O$ | 2.0% |
| 500 ppm NO + 530 ppm $NH_3$ + 10% $O_2$ + 5% $H_2O$ | 6.7% |
| 10% $O_2$ | 1.0% |
| 500 ppm NO + 10% $O_2$ | 2.1% |
| 530 ppm $NH_3$ + 10% $O_2$ | 10.6% |
| 500 ppm NO + 530 ppm $NH_3$ + 10% $O_2$ | 11.7% |
| 5% $H_2O$ | 3.0% |
| 500 ppm NO + 530 ppm $NH_3$ + 5% $H_2O$ | 18.2% |
| 500 ppm NO | 4.6% |
| 530 ppm $NH_3$ | 36.2% |
| 500 ppm NO + 530 ppm $NH_3$ | 53.0% |

EXAMPLE 2

This example shows that shortening the duration of the heating at 250° C. from 10 hours to 5 hours has only a minor effect on the SCR activity of the material. Two catalyst samples are prepared as described in Example 1. One sample is heated to 250° C. in a gas atmosphere containing $NH_3$ and NO for 10 hours, the other sample is heated to 250° C. in a gas atmosphere containing $NH_3$ and NO for 5 hours. An $NH_3$-SCR activity measurement at 200° C., as described in Example 1, reveals that the NO conversion with the material heated for 5 hours is 50.8%, and with the material heated for 10 hours is 53.0%. This shows that the initial period of the heating at 250° C. is the most important in the preparation of the active material.

EXAMPLE 3

This example shows that the method of the invention can be applied using a wide variety of concentrations of ammonia and oxides of nitrogen to produce ion-exchanged zeolites to produce active SCR materials. Catalysts were prepared according to Example 1. The catalysts were also tested according to the procedure, but the concentrations of NO and $NH_3$ was varied according to Table 2. The results shows that the concentrations of NO and $NH_3$ can be varied over a large range of concentrations.

TABLE 3

Measured NOx conversion in the $NH_3$-SCR reaction after treatment of different zeolites as described in Example3

| Treatment for 10 h at 250° C. of H-ZSM-5 + CuO in NO and $NH_3$ with the following concentrations | NOx conversion at 200° C. |
| --- | --- |
| 250 ppm NO and 265 ppm $NH_3$ | 50.8% |
| 500 ppm NO and 530 ppm $NH_3$ | 53.0% |
| 1000 ppm NO and 1060 ppm $NH_3$ | 54.3% |

TABLE 3-continued

Measured NOx conversion in the NH₃-SCR reaction after treatment
of different zeolites as described in Example3

| Treatment for 10 h at 250° C. of H-ZSM-5 + CuO in NO and NH₃ with the following concentrations | NOx conversion at 200° C. |
|---|---|

EXAMPLE 4

This example shows that the method of the invention can be applied to produce SCR active materials based on zeolites with different crystal structures. Catalysts were prepared and the NO conversion was measured, according to the procedure described in Example 1, but instead of an H-ZSM-5, an H-Beta zeolite or an H-SSZ-13 zeolite was used. Table 3 shows the measured NO conversion by use of the different zeolite materials.

TABLE 3

Measured NOx conversion in the NH3-SCR reaction after treatment
of different zeolites as described in Example 4.

| Treatment for 10 h at 250° C. in NO and NH₃ of the following zeolites | NOx conversion at 200° C. |
|---|---|
| H-ZSM-5 + CuO | 53.0% |
| H-BEA + CuO | 50.1% |
| H-SSZ-13 + CuO | 46.0% |

EXAMPLE 5

This example shows that the method of the invention is not limited to zeolites, which are microporous silica-aluminates, but also can be applied to other microporous materials with ion-exchange capacity. A catalyst was prepared and the conversion of NO was measured according to the procedure in Example 1, but instead of a H-ZSM-5 a H-SAPO-34 material was used. The measured NO conversion was 28.0%. It is noted that the SCR-active SAPO-34 material has not been heated further than 250° C. after addition of the Cu. This example illustrates that the method of the invention provides a way to produce an active catalyst based on SAPO-34 without the need of activation at elevated temperatures (>700° C.), which is the case for conventionally ion-exchanged SAPO-34 materials [P. N. R. Vennestrøm, A. Katerinopoulou, R. R. Tiruvalam, A. Kustov, P. G. Moses, P. Concepcion, A. Corma, ACS Catal. 2013, 3, 2158-2161.] after addition of Cu to the microporous material.

EXAMPLE 6

This example shows that the method of the invention is preferably applied in the temperature range 150-300° C. A powder mixture consisting of 30 mg H-beta zeolite and 3 mg CuO was put in a reactor and exposed for 5 hours to a gas mixture consisting of 500 ppm NH3 and 500 ppm NO in N2 at a predefined pretreatment temperature. After the pretreatment, the temperature was changed to 200° C. and the sample was exposed to a gas mixture of 600 ppm NH₃, 500 ppm NO, 10% $O_2$, 6% $H_2O$ in $N_2$, at a total flow rate 300 Nml/min, and the conversion of NO was measured as a record for the material's SCR activity. Table 4 provides an overview of the treatment temperatures, together with the SCR activity of thus prepared catalyst measured as NO conversion afterwards.

TABLE 4

Measured NOx conversion in the NH₃-SCR reaction after
treatment of a H-Beta zeolite in a gas consisting of 500 ppm
NH₃, 500 ppm NO and balance N₂ at different temperatures
as described in Example 6.

| Treatment of a mixture of H-Beta zeolite and CuO for 5 h in a mixture of 500 ppm NO and 500 ppm NH₃ in N2 at the following temperatures | NOx conversion at 200° C. |
|---|---|
| 100° C. | 10.1% |
| 150° C. | 14.4% |
| 175° C. | 28.5% |
| 200° C. | 53.9% |
| 225° C. | 57.7% |
| 250° C. | 59.8% |
| 300° C. | 64.5% |

From table 4 that a significant enhancement of the NO conversion is observed above 150° C., indicating a more efficient ion exchange in this temperature range.

EXAMPLE 7

This example shows that the NH₃/NO ratio in the gaseous atmosphere containing NH₃ and an oxide of nitrogen may be varied over a wide range. A powder mixture consisting of 30 mg H-beta zeolite and 3 mg CuO was put in a reactor and exposed for 5 hours to a treatment gas mixture containing 500 ppm NO and a predetermined amount of NH₃ at 250° C. After the pretreatment, the sample was cooled to 200° C. and exposed to a gas mixture of 600 ppm NH₃, 500 ppm NO, 10% $O_2$, 6% $H_2O$ in $N_2$, at a total flow rate 300 Nml/min, and the conversion of NO was measured as a record for the material's SCR activity. Table 5 provides an overview of NH₃ content and NH₃/NO ratio in the treatment gas mixture, together with the SCR activity of thus prepared catalyst measured as NO conversion afterwards.

TABLE 5

Measured NOx conversion in the NH₃-SCR reaction after
treatment of a H-Beta zeolite in a gas atmosphere consisting
of 500 ppm NO and various amounts of NH3 and balance N₂
at 250° C. as described in Example 7.

| Treatment gas composition | NH3/NO ratio | NOx conversion at 200° C. after treatment at 250° C. for 5 h |
|---|---|---|
| 0 ppm NO/500 ppm NH₃/N₂ | infinite | 52.2% |
| 500 ppm NO/500 ppm NH₃/N₂ | 1.00 | 59.4% |
| 500 ppm NO/375 ppm NH₃/N₂ | 0.75 | 57.3% |
| 500 ppm NO/250 ppm NH₃/N₂ | 0.50 | 54.7% |
| 500 ppm NO/125 ppm NH₃/N₂ | 0.25 | 54.1% |
| 500 ppm NO/0 ppm NH₃/N₂ | 0.00 | 19.6% |

From the data in Table 5, it can be seen that the ion exchange process according to the invention is effective for a wide range of compositions of the treatment gas atmosphere containing NH₃ and NO. If no NH₃ is present, the NOx conversion is significantly lower, indicating a less efficient ion-exchange process. The positive effect of NO on the ion exchange process in the presence of NH₃ is clearly seen in the enhancement of the NO conversion compared to that after treatment in $NH_3$ alone.

EXAMPLE 8

This example shows that the ion exchange process by the method of the invention is more effective at low oxygen concentrations. A powder mixture consisting of 30 mg H-beta zeolite and 3 mg CuO was put in a reactor and exposed for 5 hours to a treatment gas mixture containing 500 ppm NO, 500 ppm of $NH_3$, and 0, 1, 5, or 10% oxygen, at 250° C. After the pretreatment, the sample was cooled to 200° C. and exposed to a gas mixture of 600 ppm $NH_3$, 500 ppm NO, 10% $O_2$, 6% $H_2O$ in $N_2$, at a total flow rate 300 Nml/min, and the conversion of NO was measured as a record for the material's SCR activity. Table 6 provides an overview of the oxygen concentration in the treatment gas mixture, together with the SCR activity of thus prepared catalyst measured as NO conversion afterwards.

TABLE 6

Measured $NO_x$ conversion in the $NH_3$-SCR reaction after treatment of a H-Beta zeolite in a gas consisting of 500 ppm $NH_3$, 500 ppm NO and 0, 1, 5, or 10% O2, with balance $N_2$ at 250° C. as described in Example 8.

| Treatment of a mixture of H-Beta zeolite and CuO for 5 h in a mixture of 500 ppm NO and 500 ppm $NH_3$ in N2 at 250° C. with the following concentrations of oxygen in the treatment gas: | NOx conversion at 200° C. |
|---|---|
| 0% $O_2$ | 59.4% |
| 1% $O_2$ | 47.5% |
| 5% $O_2$ | 47.8% |
| 10% $O_2$ | 46.7% |

From Table 6, it is seen that the NOx conversion after treatment in a gas containing 1-10% $O_2$ is almost the same, while the NOx conversion after treatment in a gas without oxygen is clearly higher, indicating a more efficient ion-exchange in that case.

EXAMPLE 9

This example shows that the ion exchange process according to the invention is more efficient at temperatures below 300° C. A powder mixture consisting of 30 mg H-beta zeolite and 3 mg CuO was put in a reactor and exposed for 5 hours to a treatment gas mixture containing 500 ppm NO and 500 ppm of $NH_3$ in nitrogen at various temperatures in the range 150-450° C. After the pretreatment, the sample was cooled to 200° C. and exposed to a gas mixture of 600 ppm $NH_3$, 500 ppm NO, 10% $O_2$, 6% $H_2O$ in $N_2$, at a total flow rate 300 Nml/min, and the conversion of NO was measured as a record for the material's SCR activity. Table 7 provides an overview of the treatment temperature and the corresponding SCR activity of thus prepared catalyst measured as the $NO_x$ conversion afterwards at 200° C.

TABLE 7

Measured $NO_x$ conversion in the $NH_3$-SCR reaction after treatment of a H-Beta zeolite in a gas consisting of 500 ppm $NH_3$, 500 ppm NO with balance $N_2$ at different temperatures in the ranger 150-450° C. as described in Example 9.

| 5 h treatment in 500 ppm $NH_3$/500 ppm NO/$N_2$ at the following temperatures: | NOx conversion at 200° C. |
|---|---|
| 150° C. | 14.3 |
| 175° C. | 28.2 |
| 200° C. | 53.7 |
| 250° C. | 59.4 |
| 325° C. | 59.4 |
| 350° C. | 40.8 |
| 400° C. | 26.3 |
| 450° C. | 25.1 |

The results in Table 7 shows that the NOx conversion after treatment in the range 200-325° C. is highest, indicating that the ion-exchange procedure according to the invention is most effective in this temperature range.

The invention claimed is:

1. Method for the preparation of a metal exchanged crystalline microporous material or mixtures of metal exchanged crystalline microporous materials comprising the steps of providing a dry mixture containing a) one or more crystalline microporous materials that exhibit ion exchange capacity and b) one or more metal compounds; heating the mixture in a gaseous atmosphere containing ammonia and one or more oxides of nitrogen to a temperature and for a time sufficient to initiate and perform a solid state ion exchange of ions of the metal compound and ions of the crystalline microporous material; and obtaining the crystalline metal-exchanged microporous material.

2. Method according to claim 1, wherein the crystalline microporous material is selected from the group consisting of zeolite or zeotype materials.

3. Method according to claim 2, where the zeolite or zeotype materials have the framework code of AEI, AFX, CHA, KFI, LTA, IMF, ITH, MEL, MFI, SZR, TUN, *BEA, BEC, FAU, FER, MOR, LEV.

4. Method according to claim 2, wherein the zeolite or zeotype materials are selected from the group consisting of ZSM-5, zeolite Y, beta zeolite, SSZ-13, SSZ-39, SSZ-62, Chabazite, and SAPO-34, SAPO-44, Ferrierite, TNU-9.

5. Method according to claim 1, wherein the crystalline microporous material or mixtures of crystalline microporous materials are in the H or $NH_4$ form.

6. Method according to claim 1, wherein the crystalline microporous material or mixtures of crystalline microporous material contains an organic structure directing agent.

7. Method according to claim 1, wherein the metal compound is selected from the group of metal oxides, metal nitrates and phosphates, sulfates, oxalates, acetates or a combination thereof.

8. Method according to claim 1, wherein the metals in the metal compounds are selected from the group of Fe, Co, Cu.

9. Method according to claim 1, wherein the metal compounds comprise one or more oxides of Cu.

10. Method according to claim 1, wherein the oxide of nitrogen is selected from nitrogen monoxide, and nitrogen dioxide and mixtures thereof.

11. Method according to claim 1, wherein the content of ammonia in the atmosphere is between 1 and 5000 vol. ppm.

12. Method according to claim 1, wherein the content of the one or more nitrogen oxides in the gaseous atmosphere is between 1 and 5000 vol. ppm.

13. Method according to claim 1, wherein the molar ratio of ammonia to nitrogen oxides is larger than 0.01, preferably between 0.2 and 1.

14. Method according to claim 1, wherein the oxygen content in the atmosphere is 1% or lower.

15. Method according to claim 1, wherein the gaseous atmosphere contains 5% water or less.

16. A method according to claim 1, wherein the mixture is heated in the gaseous atmosphere containing ammonia and one or more oxides of nitrogen to a temperature lower than 300° C.

17. A method according to claim 1, wherein the mixture is heated in the gaseous atmosphere containing ammonia and one or more oxides of nitrogen to a temperature in a range from 100° C. and to below 300° C.

18. A method according to claim 1, wherein the mixture is heated in the gaseous atmosphere containing ammonia and one or more oxides of nitrogen to a temperature in a range between 150° C. and 250° C.

19. A method for the removal of nitrogen oxides from exhaust gas by selective catalytic reduction with a reductant, comprising:

preparing a catalyst comprising a metal exchanged crystalline microporous material or mixtures of metal exchanged crystalline microporous materials by: providing a dry mixture containing (a) one or more crystalline microporous materials that exhibit ion exchange capacity and (b) one or more metal compounds; heating the mixture in a gaseous atmosphere containing ammonia and one or more oxides of nitrogen to a temperature and for a time sufficient to initiate and perform a solid state ion exchange of ions of the metal compound and ions of the crystalline microporous material; and obtaining the catalyst comprising crystalline metal-exchanged microporous material; and containing the exhaust gas with the catalyst comprising metal exchanged crystalline microporous material or mixtures of metal exchanged crystalline microporous materials.

20. A method according to claim 19, wherein the reductant is ammonia or a precursor thereof.

21. A method according to claim 19, wherein the reductant is hydrocarbons.

* * * * *